(12) United States Patent
Wilde et al.

(10) Patent No.: US 9,272,465 B2
(45) Date of Patent: Mar. 1, 2016

(54) HIGH-QUALITY FLAME-RETARDANT DECORATIVE FINISH FOR INTERIOR PANELS

(71) Applicants: John Christopher Wilde, Mill Creek, WA (US); Gary D. Benham, Marysville, WA (US)

(72) Inventors: John Christopher Wilde, Mill Creek, WA (US); Gary D. Benham, Marysville, WA (US)

(73) Assignee: The Boeing Company, Chicagi, IL (US)

( * ) Notice: Subject to any disclaimer, the term of this patent is extended or adjusted under 35 U.S.C. 154(b) by 537 days.

(21) Appl. No.: 13/662,526

(22) Filed: Oct. 28, 2012

(65) Prior Publication Data

US 2014/0120303 A1   May 1, 2014

(51) Int. Cl.
  *B32B 37/10*    (2006.01)
  *B29C 63/48*    (2006.01)
  *B32B 38/00*    (2006.01)
  *B64C 1/06*     (2006.01)

(52) U.S. Cl.
  CPC ........... *B29C 63/481* (2013.01); *B32B 38/0012* (2013.01); *B32B 38/145* (2013.01); *B32B 2038/002* (2013.01); *B32B 2307/3065* (2013.01); *B32B 2325/00* (2013.01); *B32B 2375/00* (2013.01); *B32B 2605/18* (2013.01); *B32B 2607/00* (2013.01); *B64C 1/066* (2013.01); *Y10T 428/24149* (2015.01); *Y10T 428/24851* (2015.01); *Y10T 428/24868* (2015.01)

(58) Field of Classification Search
  CPC ........... B29C 63/481; B29C 2063/483; B29C 2063/485; B32B 2307/3065; B32B 28/0012; B32B 38/145; B32B 2038/002; B32B 2375/00; B32B 2605/18; B32B 2607/00; B32B 2325/00; B64C 1/066; Y10T 428/24149; Y10T 428/24868; Y10T 428/24851

USPC .............. 156/244.23, 45, 44, 73.5, 73.6, 153; 427/356, 358, 359

See application file for complete search history.

(56) References Cited

U.S. PATENT DOCUMENTS

| | | | |
|---|---|---|---|
| 4,169,005 A | 9/1979 | Fogle et al. | |
| 4,233,195 A * | 11/1980 | Mills | ............................ 524/441 |
| 6,294,261 B1 * | 9/2001 | Sangeeta et al. | .............. 428/469 |
| 7,824,590 B2 | 11/2010 | Wilde et al. | |
| 7,968,168 B2 | 6/2011 | Bauer et al. | |
| 8,097,108 B2 | 1/2012 | Wilde et al. | |
| 2005/0052516 A1 | 3/2005 | Wilde et al. | |
| 2006/0277807 A1 * | 12/2006 | Wilde et al. | ................ 40/606.07 |
| 2007/0031645 A1 * | 2/2007 | Wilde | ..................... B32B 27/00 428/204 |
| 2008/0226846 A1 * | 9/2008 | Hill | ................................ 428/13 |

(Continued)

OTHER PUBLICATIONS

Int'l Search Report and Written Opinion, Int'l Appln. No. PCT/US2013/057958, dated Nov. 19, 2013.

*Primary Examiner* — Jacob T Minskey
*Assistant Examiner* — Vishal I Patel
(74) *Attorney, Agent, or Firm* — Ostrager Chong Flaherty & Broitman P.C.

(57) ABSTRACT

A high-quality, fire-resistant, decorative finish for panels made of composite material, such as aircraft interior panels. Starting with a flat or complex contoured panel, a flame-retardant filler primer is applied to the panel surface. This filler primer is then sanded to a very smooth solid surface. In a separate process, a polymeric film is printed with a desired pattern or image. The polymeric film is then bonded to the primed panel surface using an adhesive. The non-printed side of the polymeric film is bonded to the panel. A thin highly durable polymeric coating (clear or tinted) is then applied to the exposed printed side.

20 Claims, 2 Drawing Sheets

(56) References Cited

U.S. PATENT DOCUMENTS

| | | |
|---|---|---|
| 2009/0321002 A1 | 12/2009 | Spengler |
| 2011/0277903 A1* | 11/2011 | Adams .................... 156/60 |
| 2012/0148824 A1* | 6/2012 | Martin et al. ............ 428/301.4 |
| 2012/0164373 A1 | 6/2012 | Spencer et al. |

* cited by examiner

HIGH-QUALITY FLAME-RETARDANT DECORATIVE FINISH FOR INTERIOR PANELS

BACKGROUND

This disclosure generally relates to panels made of composite material and their methods of manufacture. In particular, this disclosure relates to panels having a flame-retardant decorative finish and methods for manufacturing such panels. As used herein, the term "flame-retardant" means that the finish meets standard aircraft interior panel flammability requirements.

Certain mobile platforms, such as aircraft, trains and automobiles, may generally employ laminated structures to form various interior panels. Laminated structures serve to provide visually appealing surfaces to the objective viewer. For example, in a commercial aircraft, a plurality of laterally aligned overhead stowage bin doors are typically included along the port and starboard sides of the passenger cabin of the aircraft. These stowage bin doors each generally include a laminate disposed on the front of the stowage bin door to create a visually appealing interface for the customer. Further, the sidewalls or other panels in the passenger cabin may be lined with laminates to create a lightweight visually appealing surface. Advantageously, such laminates used in interior panels may also include patterns or other visually pleasing images. In addition, many other surfaces may be coated with a laminate to increase the visual appeal of the surface, such as doors, ceiling tiles and the like. Further, in some instances, laminates may also be used to display information to potential viewers, such as safety hazards or use instructions.

It is known to produce high-quality, fire-resistant, decorative finishes for aircraft interior panels using traditional industry standards such as bespoke painted panels or hydro transfer printing technology (sometimes referred to as "Hydro Printing"). Both of these industry standards are highly specialized, expensive, and somewhat limited (not a large number of providers).

Although the hydro-transfer printing process produces a very fine high-quality finish, it requires costly materials, part fixturing, process tuning (for the part to be finished), and specialized equipment (e.g., a water tank). The cost per part finish can be high. Also, there may be some size or geometry limitations due to the size of the special hydro-transfer film or because the part needs to be dipped into a water-filled tank or vat.

There is a need for a method of producing high-quality, fire-resistant, decorative finishes for aircraft interior panels without using the traditional industry standards such as bespoke painted panels or hydro-transfer printing technology.

SUMMARY

The method of finishing disclosed herein produces a high-quality, fire-resistant, decorative finish for panels comprising a substrate made of composite material, such as aircraft interior panels. Starting with a flat or complex contoured composite honeycomb sandwich panel or composite laminate, a flame-retardant filler primer (containing one or more flameproofing agents) is applied to the panel surface. This filler primer will allow the panel surface to be sanded to a very smooth solid surface. Once sanded, the surface is free of typical imperfections associated with composite sandwich panels and laminates, such as pits, voids, weave or core telegraphed patterns. In a separate process, a polymeric film (e.g., polyvinyl fluoride (PVF) film) is ink jet printed or screen printed with a desired pattern or image. One example may be an ink-jet-printed fine wood image. Optionally, the polymeric film and ink are selected to provide favorable fire retardance properties and the ability to be thermally formed. The non-printed side of the polymeric film is then bonded to the primed panel surface using an adhesive. Then a thin highly durable polymeric (e.g., polyurethane) coating (clear or tinted), optionally containing one or more flameproofing agents, is applied to the exposed printed side. This coating can have a very high-gloss finish or a lower-gloss matte finish.

The product of the foregoing finishing process is a panel having an un-encapsulated printed polymeric film bonded onto a primed (with fire-resistant filler primer) composite honeycomb sandwich panel or composite laminate (flat or complex contoured), with the printed surface having a durable polymeric coating applied thereon. Unlike a bespoke painted panel, the use of a repeatable printing process allows for repeatable images and fine-lined patterns. Printing the pattern or image on the formable polymeric film allows bonding to flat or complex contoured panels without needing a water tank or expensive materials or fixturing, as are required in hydro-transfer printing. Application of the high-gloss coating should be the same as that used in bespoke painting and hydro-transfer printing.

As explained in more detail below, one aspect of the subject matter disclosed herein is a method of finishing a panel, comprising: applying a filler material comprising one or more flameproofing agents on a surface of a panel to form a filled panel surface; smoothening the filled panel surface; printing a pattern or an image on one side of a polymeric film comprising a first polymeric material; bonding the non-printed side of the polymeric film to the smoothened filled panel surface; and coating the printed side of the polymeric film with a coating material comprising a second polymeric material. Optionally, the ink and/or coating may comprise one or more flameproofing agents.

Another aspect of the disclosed subject matter is a finished panel comprising a panel and a finish applied on a surface of the panel, wherein the finish comprises: flame-retardant filler material disposed on a surface of the panel; a polymeric film comprising a first polymeric material; ink applied on one side of the polymeric film that faces away from the filler material, the ink forming a pattern or an image; a layer of adhesive material disposed between the filler material and a second side of the polymeric film; and a coating comprising a second polymeric material disposed on the printed side of the polymeric film. This second polymeric material can be clear or tinted, allowing the pattern or image to be visible through the coating. Optionally, the ink and/or coating may comprise one or more flameproofing agents.

A further aspect is an interior panel on an aircraft comprising: a substrate made of composite material; flame-retardant filler material disposed on a surface of the substrate; a polymeric film comprising a first polymeric material; ink applied on one side of the polymeric film to form a pattern or an image; and a layer of adhesive material disposed between the filler material and the polymeric film for adhering the polymeric film to the substrate. The ink is printed on the side of the polymeric film which is not in contact with the adhesive. The panel further comprises a coating disposed on the printed side of the polymeric film, which coating comprises a second polymeric material through which the ink is visible.

Other aspects of the invention are disclosed and claimed below.

BRIEF DESCRIPTION OF THE DRAWINGS

Various embodiments will be hereinafter described with reference to drawings for the purpose of illustrating the foregoing and other aspects of the invention.

FIG. 2 is presented solely for the purpose of illustrating the ordering (not thicknesses) of the various layers in accordance with one embodiment.

Reference will hereinafter be made to the drawings in which similar elements in different drawings bear the same reference numerals.

DETAILED DESCRIPTION

Figure 1:
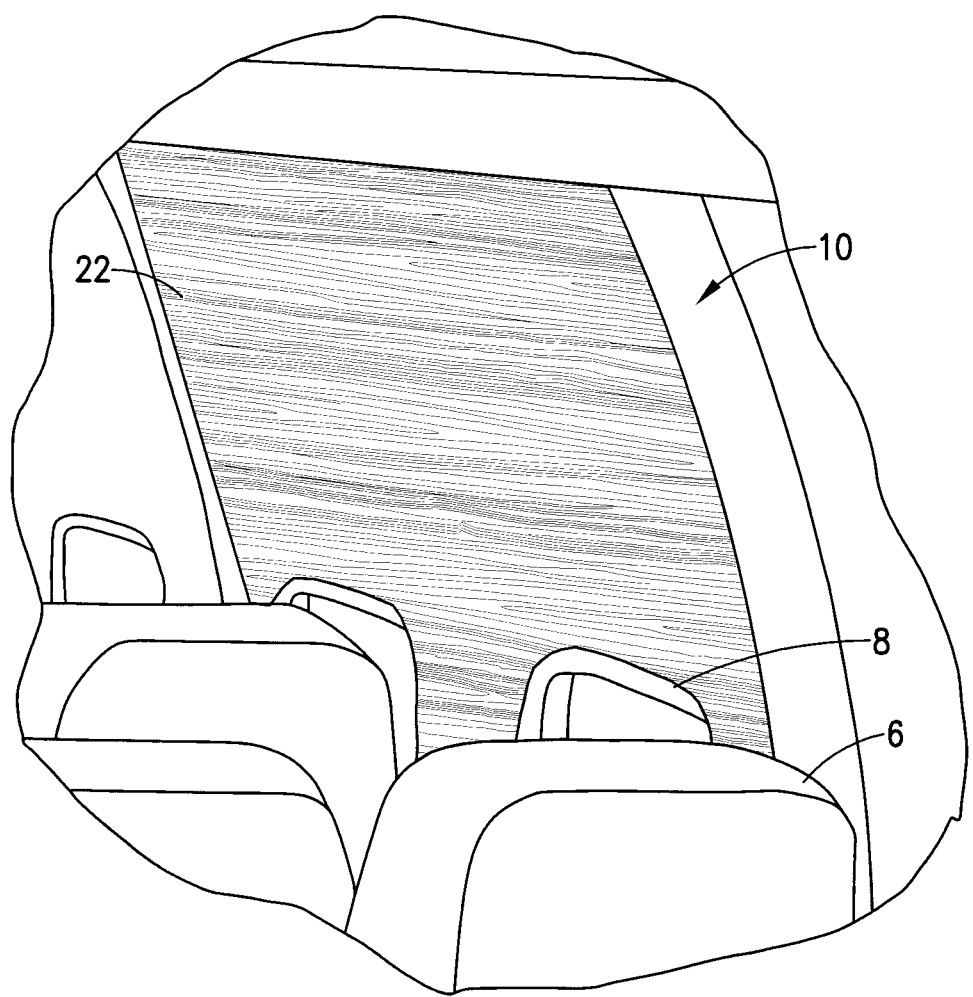
FIG. 1 is a diagram showing an isometric view of a sidewall panel in a passenger cabin of an aircraft, which sidewall panel has been fabricated in accordance with the method disclosed herein.

FIG. 1 shows a portion of an interior panel 10 installed in the passenger cabin of an aircraft having rows of seats 6. The interior panel 10 may be fabricated with multiple openings 8 in which respective windows are installed. In the example depicted in FIG. 1, the interior panel 10 has a wood image 22 printed on the interior surface of the panel. However, the interior panel 10 may have other images or patterns printed thereon. It should be appreciated that panels of the type shown in FIG. 1 could be installed in other types of mobile platforms, such as trains and automobiles, or even in a fixed (i.e., non-mobile) structure.

Figure 2:
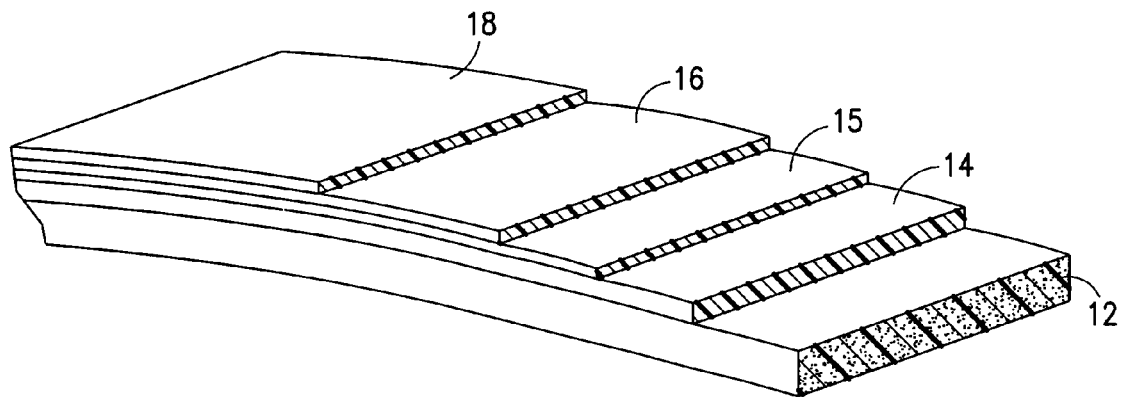
FIG. 2 is a diagram showing various layers (in cross section) of a laminate fabricated in accordance with the method disclosed herein. The various layers are not drawn to scale and the various layer thicknesses depicted are not intended to portray any particular relationship amongst respective layer thicknesses.

FIG. 2 shows various layers (in cross section) of the interior panel depicted in FIG. 1. A laminate is provided for forming an aesthetically pleasing flame-retardant exterior surface on an object 12, for example, a decorative interior panel installed in a commercial aircraft. Such an interior panel may take the form of a flat or complex contoured composite honeycomb sandwich panel or composite laminate. Referring to FIG. 2, the surface of interior panel 12 has a fire-resistant primer 14 applied thereon, the resulting primed surface being then sanded to improve overall surface finish. The application of primer 14 improves total fire resistance of panel 12. The sanded primer coating 14 in turn is covered by a single printed layer 16 that is bonded thereto by a layer of adhesive 15. In accordance with one embodiment, the layer 16 comprises polymeric film, e.g., polyvinyl fluoride film, having ink printed on one side. The printed surface of layer 16 faces away from the interior panel 12. That surface in turn is coated with another layer 18 of polymeric material, e.g., polyurethane. The polyurethane forms a highly durable clear gloss or matte finish coat that is uniformly applied on the film-coated composite part.

One example of a suitable liquid adhesive which can be used is a two-component adhesive system that is commercially available from Bostik Limited, Staffordshire, United Kingdom, in the form of a kit bearing the product designation ADH 7132K. The two components are: (1) Bostik 7132R (resin); and (2) Boscodur 24T (catalyst). The base ingredient of Bostik 7132R in linear saturated polyester, whereas the base ingredient of Boscodur 24T is polyisocyanate. This liquid adhesive can be applied by direct roll, reverse roll, gravure, or other coater or by spraying. The two parts must be mixed in accordance with a specified mixing ratio and blended to a homogenous solution. The wet adhesive should be applied to the least porous laminating surface and the solvent should be evaporated by standard drying techniques. It is known to use this adhesive system to laminate decorative films to honeycomb sidewalls in the construction of aircraft cabin interiors.

The ink can be deposited on the film layer 18 by a suitable printer, such as a digital ink jet printer. Alternatively, it may be possible to apply a desired image or pattern on the film layer 18 using a screen printing process. Since the ink is deposited on the side that will become the external surface of layer 18, it will be appreciated that the pattern or image formed by the ink need not be transposed during the printing process. In addition, the PVF film 18 forms a suitable background against which the colors of the ink stand out, such as a white background. However, it will be appreciated that other colors could be utilized depending on the color scheme used in the pattern or image.

Figure 3:
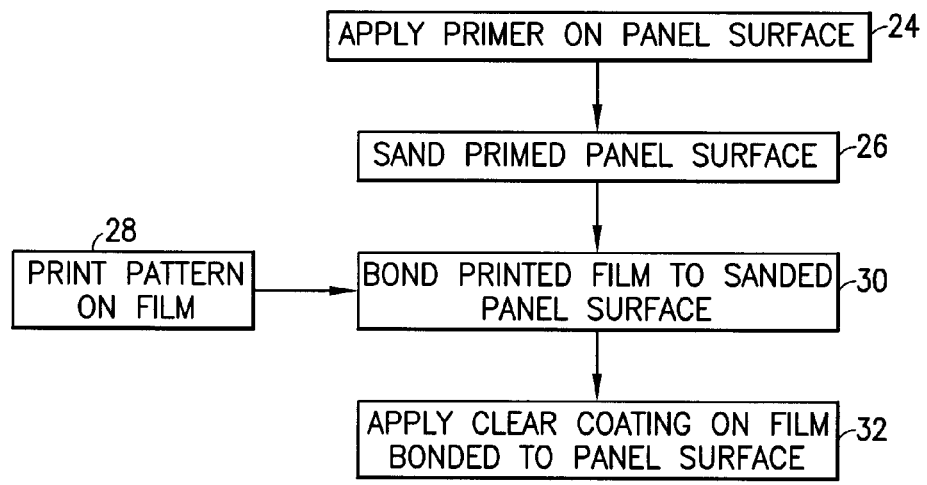
FIG. 3 is a flowchart showing steps of the fabrication method in accordance with one embodiment.

A method of finishing a panel made of composite material by applying a printed laminate in accordance with the above-described embodiment is shown in FIG. 3. A filler material having a flame-retardant property is applied on a surface of the panel to form a filled panel surface (step 24). Then the filled panel surface is sanded or smoothened by other means (step 26). One example of a suitable flame-retardant filler primer material is Mankiewicz Alexit FST-Filler 343-60, which is urethane-based.

Before or after the primer is applied, a pattern or an image is printed on one side of a clear or tinted polymeric film (step 28) made of a first polymeric material (e.g., polyvinyl fluoride).

After a pattern or image has been printed on the polymeric film, the non-printed side of the polymeric film is bonded to the smoothened filled panel surface (step 30). The non-printed side of the film may be bonded to the panel by applying a layer of adhesive material on the smoothened panel surface (e.g., by spraying); pressing the non-printed side of the polymeric film against the smoothened panel surface with the adhesive material therebetween; and curing the adhesive material.

After the printed polymeric film has been bonded to the smoothened primed panel surface, the exposed printed side of the polymeric film is coated (step 32) with a second polymeric material (e.g., polyurethane paint). The resulting clear coating can have a very high gloss or a lower gloss matte finish. One example of a suitable clear coating material is Mankiewicz Alexit FST-Clearcoat 460-16.

U.S. Pat. No. 7,968,168, assigned to Mankiewicz Gebr. & Co., discloses a variety of flameproofing agents which are suitable for use in aircraft construction materials. The listing of flameproofing agents disclosed at column 7, line 53 to column 8, line 58 of that patent is incorporated by reference herein. One or more of such flameproofing agents can be incorporated in the filler material. Optionally, one or more flameproofing agents can also be incorporated in the ink and/or clear coating.

The result of the foregoing process is a low-cost printed panel having a high-quality finish which is suitable for use in aircraft interiors.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings herein without departing from the essential scope thereof.

Therefore it is intended that the claims not be limited to the particular embodiments disclosed.

The method claims set forth hereinafter should not be construed to require that the steps recited therein be performed in alphabetical order or in the order in which they are recited, and should not be construed to exclude two or more steps being performed concurrently.

The invention claimed is:

1. A method of finishing a panel, comprising:
applying a filler material comprising one or more flameproofing agents on a surface of a panel to form a filled panel surface;
smoothening said filled panel surface;
printing a pattern or an image on one side of a polymeric film comprising a first polymeric material;
bonding another side of said polymeric film to said smoothened filled panel surface; and
coating said one side of said polymeric film with a coating material comprising a second polymeric material,
wherein said bonding step comprises:
applying a layer of adhesive material on said smoothened panel surface;
pressing said another side of said polymeric film against said smoothened panel surface with said adhesive material therebetween; and
curing said adhesive material.

2. The method as recited in claim 1, wherein said first polymeric material comprises polyvinyl fluoride and said second polymeric material comprises polyurethane.

3. The method as recited in claim 1, wherein said printing comprises application of ink that comprises one or more flameproofing agents.

4. The method as recited in claim 1, wherein said second polymeric material comprises one or more flameproofing agents.

5. The method as recited in claim 1, wherein said panel comprises a composite honeycomb sandwich panel.

6. The method as recited in claim 1, wherein said panel comprises a composite laminate.

7. A method of finishing a panel, comprising:
applying a filler material comprising one or more flameproofing agents on a surface of a panel to form a filled panel surface;
smoothening the filled panel surface;
printing a pattern or an image on one side of a polymeric film comprising a first polymeric material;
applying a layer of adhesive material on the filled and smoothened panel surface;
pressing another side of the polymeric film against the filled and smoothened panel surface with the adhesive material therebetween;
curing the adhesive material until the another side of the polymeric film is bonded to the filled and smoothened panel surface; and
coating the one side of the polymeric film with a coating material comprising a second polymeric material.

8. The method as recited in claim 7, wherein the first polymeric material is polyvinyl fluoride and the second polymeric material is polyurethane.

9. The method as recited in claim 7, wherein the filled panel surface is smoothened by sanding.

10. The method as recited in claim 7, wherein the layer of adhesive material is applied by spraying.

11. The method as recited in claim 7, further comprising installing the panel in an interior of an aircraft fuselage.

12. The method as recited in claim 7, wherein the panel is an interior panel.

13. The method as recited in claim 1, further comprising installing the panel in an interior of an aircraft fuselage.

14. The method as recited in claim 1, wherein the panel is an interior panel.

15. The method as recited in claim 1, wherein the filled panel surface is smoothened by sanding.

16. The method as recited in claim 1, wherein the layer of adhesive material is applied by spraying.

17. The method as recited in claim 7, wherein said printing comprises application of ink that comprises one or more flameproofing agents.

18. The method as recited in claim 7, wherein said second polymeric material comprises one or more flameproofing agents.

19. The method as recited in claim 7, wherein said panel comprises a composite honeycomb sandwich panel.

20. The method as recited in claim 7, wherein said panel comprises a composite laminate.

* * * * *